(12) United States Patent
Spitz

(10) Patent No.: US 10,528,233 B2
(45) Date of Patent: Jan. 7, 2020

(54) WORK VEHICLE EQUIPPED WITH DISPLAY UNIT

(71) Applicant: KUBOTA CORPORATION, Osaka (JP)

(72) Inventor: David Spitz, Atlanta, GA (US)

(73) Assignee: KUBOTA CORPORATION, Osaka (JP)

(*) Notice: Subject to any disclaimer, the term of this patent is extended or adjusted under 35 U.S.C. 154(b) by 84 days.

(21) Appl. No.: 15/848,659

(22) Filed: Dec. 20, 2017

(65) Prior Publication Data

US 2019/0187869 A1 Jun. 20, 2019

(51) Int. Cl.
| | | |
|---|---|---|
| *G06F 3/0484* | (2013.01) |
| *G09F 21/04* | (2006.01) |
| *A01D 34/00* | (2006.01) |
| *B60K 37/02* | (2006.01) |
| *B60K 37/06* | (2006.01) |
| *G06F 3/0482* | (2013.01) |
| *G06F 3/0488* | (2013.01) |
| *G06F 3/0481* | (2013.01) |
| *A01D 34/64* | (2006.01) |
| *A01D 34/66* | (2006.01) |

(52) U.S. Cl.
CPC ......... *G06F 3/0484* (2013.01); *A01D 34/006* (2013.01); *B60K 37/02* (2013.01); *B60K 37/06* (2013.01); *G06F 3/0482* (2013.01); *G06F 3/0488* (2013.01); *G06F 3/04817* (2013.01); *G09F 21/04* (2013.01); *A01D 34/64* (2013.01); *A01D 34/66* (2013.01); *B60K 2370/11* (2019.05); *B60K 2370/122* (2019.05); *B60K 2370/1442* (2019.05)

(58) Field of Classification Search
CPC .............................. G06F 3/0484; G06F 34/006
See application file for complete search history.

(56) References Cited

U.S. PATENT DOCUMENTS

| | | | |
|---|---|---|---|
| 8,991,143 B2 | 3/2015 | Fujiwara et al. | |
| 9,376,981 B2 | 6/2016 | Nagumo et al. | |
| 9,572,298 B2 | 2/2017 | Takaoka et al. | |
| 9,575,628 B2 | 2/2017 | Meegan et al. | |
| 10,188,029 B1* | 1/2019 | Brown | A01D 34/008 |
| 2014/0059990 A1* | 3/2014 | Fujiwara | A01D 34/006 56/10.2 R |
| 2016/0193970 A1* | 7/2016 | Takaoka | A01D 34/82 56/229 |
| 2017/0334500 A1* | 11/2017 | Jarek | B62J 99/00 |

* cited by examiner

*Primary Examiner* — Roland J Casillas
(74) *Attorney, Agent, or Firm* — Greenblum & Bernstein, P.L.C.

(57) ABSTRACT

A work vehicle includes: a traveling apparatus and a work apparatus that use rotational power from a power source configured to output rotational power by consuming fuel; a display unit having a changing data display region; a working state detection portion configured to detect a working state in which the work apparatus is being driven; an instantaneous fuel economy calculation portion configured to calculate, as instantaneous fuel economy, fuel consumption per time in the working state; and a display data generation portion configured to generate instantaneous fuel economy display data for displaying the instantaneous fuel economy in the changing data display region.

9 Claims, 8 Drawing Sheets

WORK VEHICLE EQUIPPED WITH DISPLAY UNIT

TECHNICAL FIELD

The present invention relates to a work vehicle equipped with a display unit that has a changing data display region.

BACKGROUND ART

Work vehicles disclosed in U.S. Pat. Nos. 8,991,143 and 9,572,298 include a mower unit, which serves as a work apparatus, and a flat-panel display for displaying various data regarding work travel. A display screen thereof includes a fuel display region, a water temperature display region, an engine number-of-revolutions display region, and an hour meter display region. In the fuel display region, the amount of remaining fuel is displayed in the form of a bar chart, in which a fully charged state and an empty state are indicated respectively as 100% and 0%. Fuel economy is not displayed.

U.S. Pat. No. 9,376,981 discloses a motor cycle equipped with a meter, which is constituted by a digital display device. In a display region of this meter, an average fuel consumption and an instantaneous fuel consumption are displayed in an automatically switched manner. This instantaneous fuel consumption is a travel distance per fuel consumption of 10 cc. This method to calculate instantaneous fuel consumption in a motor cycle, which travels at a high speed, is not suitable for fuel economy evaluation for a work vehicle, which travels at a low speed while driving a work apparatus.

U.S. Pat. No. 9,575,628 discloses a display system for a work vehicle. This display system includes a large number of screen pages (user interfaces), and one of these screen pages includes a display region for displaying the amount of remaining fuel, vehicle speed, and the amount of fuel consumed per time. A method to calculate the amount of fuel consumed per time is not disclosed. In the case of a work vehicle, it is favorable that calculation of instantaneous fuel economy does not involve fuel consumption in a non-working period. When the amount of fuel consumed per time is calculated in this display system, consideration is not given to distinction between a working period and a non-working period.

SUMMARY OF INVENTION

The present invention aims to enable a display unit to display instantaneous fuel economy in a manner suitable for a work vehicle that travels for work at a low speed, such as a mowing machine.

A work vehicle according to the present invention includes: a power source configured to output rotational power by consuming fuel; a traveling apparatus configured to use the rotational power from the power source; a work apparatus configured to use the rotational power from the power source; a display unit having a changing data display region; a working state detection portion configured to detect a working state in which the work apparatus is being driven; an instantaneous fuel economy calculation portion configured to calculate, as instantaneous fuel economy, fuel consumption per time in the working state; and a display data generation portion configured to generate instantaneous fuel economy display data for graphically displaying the instantaneous fuel economy in the changing data display region.

With this configuration, a working state in which the work apparatus in this work vehicle is being driven is detected, and the fuel consumption per time in this working state is calculated as the instantaneous fuel economy. Accordingly, in the calculation of this instantaneous fuel economy, the instantaneous fuel economy per time that is based on the fuel consumed in this vehicle is calculated even if the vehicle is in a stopped state, i.e. even if the travel distance is zero, as long as the work apparatus is being driven. This instantaneous fuel economy is advantageous because it serves as a barometer of ecological driving for a work vehicle in which a work apparatus is driven to perform work, in either case where the vehicle is traveling or where the vehicle is in a stopped state. The calculated instantaneous fuel economy is rendered into display data so as to be graphically displayed in the changing data display region in the display unit, which is suitable for displaying data whose values is constantly changing. Accordingly, an operator can readily ascertain the constantly changing instantaneous fuel economy through the display unit.

Another work vehicle according to the present invention includes: a power source configured to output rotational power by consuming fuel; a traveling apparatus configured to use the rotational power from the power source; a work apparatus configured to use the rotational power from the power source; a display unit having a changing data display region; an instantaneous torque calculation portion configured to calculate instantaneous torque that can be output by the power source in the working state; and a display data generation portion configured to generate instantaneous fuel economy display data for graphically displaying the instantaneous torque in the changing data display region. With this configuration, an operator can check the instantaneous torque that can be output by the power source, and can operate the work vehicle more efficiently. In addition, a load placed on the power source significantly differs between when the work apparatus is being driven and when it is not being driven. Accordingly, as a result of the instantaneous torque during work being displayed, the operator can obtain an appropriate barometer for efficient work travel.

When the traveling apparatus and the work apparatus are using rotational power from the power source, it is favorable for the operator to check both the instantaneous fuel economy and instantaneous torque during traveling work, in order to appropriately execute the traveling work as planned. For this reason, in a preferable embodiment, the instantaneous fuel economy and instantaneous torque are selected to be displayed in the changing data display region in the display unit by manually or automatically switching therebetween.

DETAILED DESCRIPTION

Figure 1:
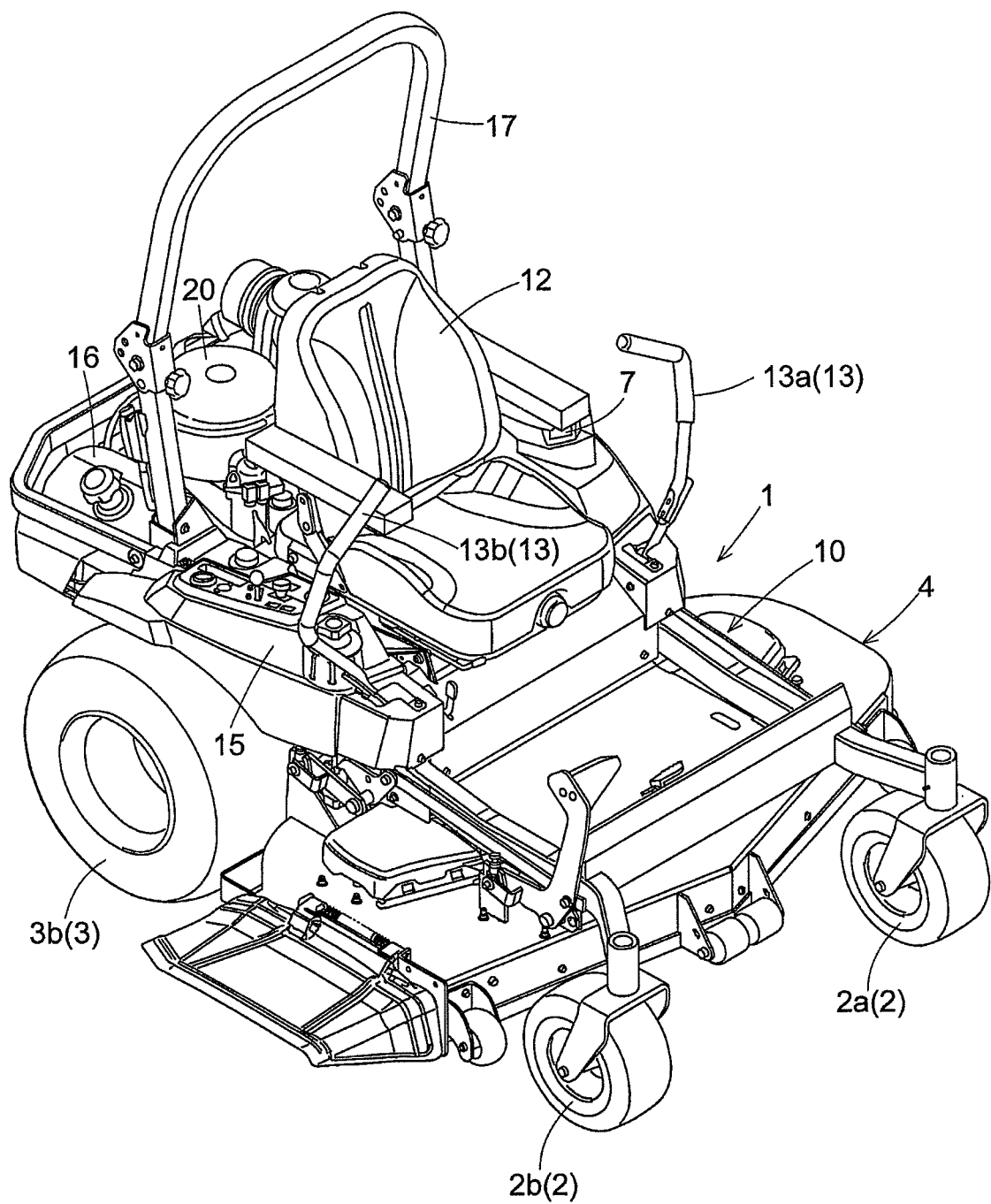
FIG. 1 is a perspective view of a mowing machine.
Figure 2:
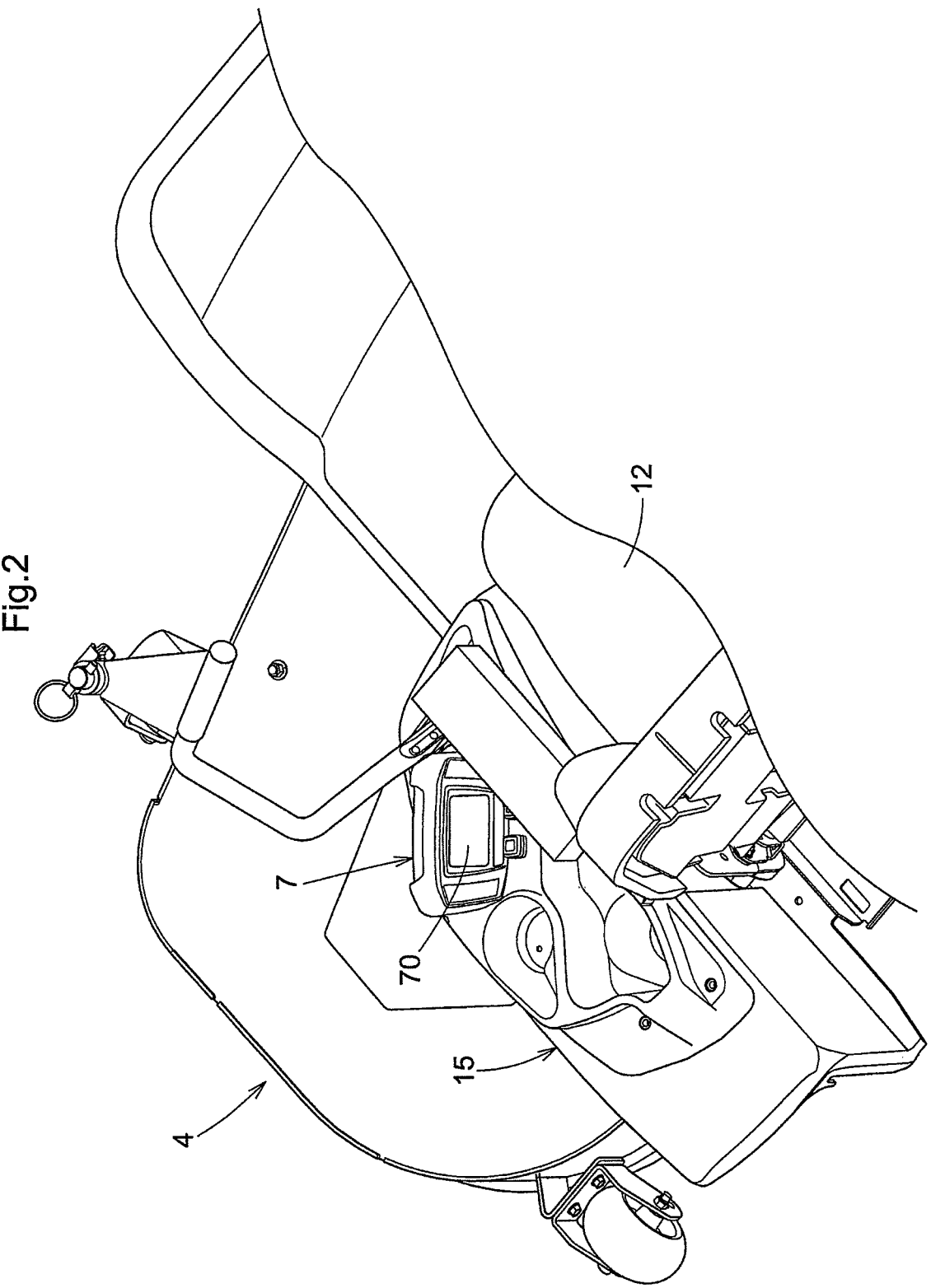
FIG. 2 is a perspective view of a display unit that is attached to the mowing machine.

A description will be given below of a mowing machine, which is an embodiment of a work vehicle according to the present invention, based on the drawings. FIG. 1 is a perspective view of a mowing machine. FIG. 2 is a diagram showing a power system of the mowing machine. Note that, in this specification, "front" means a front side relative to a front-rear direction for the machine body (traveling direction), and "rear" means a rear side relative to the front-rear direction for the machine body (traveling direction), unless stated otherwise. A left-right direction and a lateral direction mean a transverse direction for the machine body (i.e. the width direction for the machine body) that is perpendicular to the front-rear direction for the machine body. "Above/upper" and "below/lower" describe a positional relationship at ground height in a vertical direction for the machine body.

The mowing machine has a vehicle body 1, which is supported relative to the ground by a front-wheel unit 2, which is a caster unit, and a rear-wheel unit 3, which is a traveling apparatus. This mowing machine is a so-called zero-turn mower, and a left rear wheel 3a and a right rear wheel 3b, which are configured as the rear-wheel unit 3, can be independently subjected to forward/reverse speed control. The front-wheel unit 2 includes a left front wheel 2a and a right front wheel 2b. A main constituent element of the vehicle body 1 is a frame 10, which is constituted by square pipe material or the like. A mower unit 4, which serves as a work apparatus, is suspended from the frame 10 between the front-wheel unit 2 and the rear-wheel unit 3 so as to be able to move up and down.

The frame 10 extends in the front-rear direction, and an operator seat 12 is provided at a center portion of the frame 10. A floor plate is laid on an upper face of a front portion of the frame 10, and is used as a footrest for an operator.

In this embodiment, an engine 20, which is an internal combustion engine, is employed as a power source for supplying rotational power to the rear-wheel unit 3 and the mower unit 4. The engine 20 consumes fossil fuel, such as heavy oil or gasoline, when generating power. The engine 20, engine accessories, and the like are provided at a rear portion of the frame 10. The engine 20 is arranged in an orientation in which an engine output shaft 21 (see FIG. 3) protrudes downward. A fuel tank 16 is arranged on a side of the engine 20.

An arch-shaped ROPS 17 is provided so as to stand upright behind the operator seat 12. Fenders 15 are provided on both left and right sides of the operator seat 12. User operation devices, such as various operating levers and operation buttons, are arranged on upper faces of the fenders 15. As shown in FIG. 2, a display unit 7, which is constituted by liquid crystal or the like, is attached to an upper face of the left fender 15 so that its screen 70 faces the face of an operator who sits on the operator seat 12.

A steering unit 13, which is one of the user operation devices, is constituted by a left steering lever 13a, which is arranged on the left side of the operator seat 12, and a right steering lever 13b, which is arranged on the right side of the operator seat 12. The left steering lever 13a is used to adjust the number of rotations of the left rear wheel 3a, and the right steering lever 13b is used to adjust the number of rotations of the right rear wheel 3b. The left steering lever 13a and the right steering lever 13b can be displaced to pivot over a forward gear area, a neutral area, and a reverse gear area.

Figure 3:
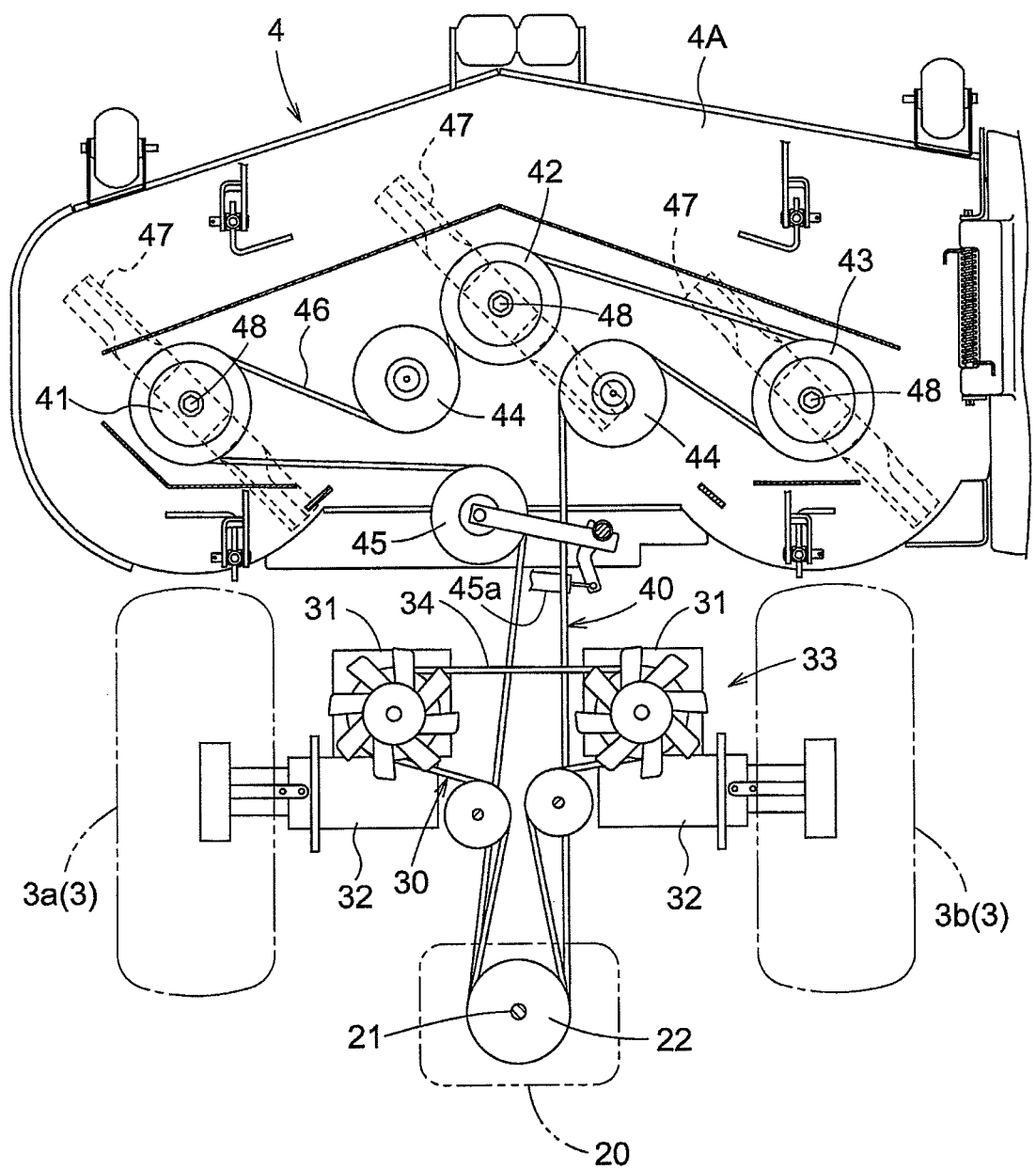
FIG. 3 is a diagram showing a power system of the mowing machine.

As schematically shown in FIG. 3, a power transmission system includes a traveling transmission mechanism 30, which transmits engine power to the rear-wheel unit 3, and a work transmission mechanism 40, which transmits engine power to the mower unit 4. Power from the engine 20 is output from an output pulley 22, which has two stages that are upper and lower stages, and is attached to the engine output shaft 21.

The traveling transmission mechanism 30 includes a pair of left and right HSTs (hydrostatic transmissions) 31, a pair of left and right gear transmission mechanisms 32, and a traveling belt transmission mechanism 33. The traveling belt transmission mechanism 33 transmits power output from the output pulley 22 to the HSTs 31 via a traveling belt 34. The gear transmission mechanisms 32 transmit, to the rear-wheel unit 3 that includes the rear wheels (left rear wheel 3a and right rear wheel 3b), the power that has been subjected to speed change by the HSTs 31.

Speed change at the left and right HSTs 31 is performed in response to a control signal that is generated based on pivoting operations made to the left steering lever 13a and the right steering lever 13b, respectively. A stopped state, a rectilinear state, a slow turning state, a pivot turning state, and a spin turning state are achieved by user operations made to the left steering lever 13a and the right steering lever 13b. The stopped state is achieved by stopping the left rear wheel 3a and the right rear wheel 3b. The rectilinear state is achieved by forwardly or reversely driving the left rear wheel 3a and the right rear wheel 3b at the same speed. The slow turning state is achieved by forwardly or reversely driving the left rear wheel 3a and the right rear wheel 3b at different speeds. The pivot turning state is achieved by stopping one of the left rear wheel 3a and the right rear wheel 3b, and forwardly or reversely driving the other one of the left rear wheel 3a and the right rear wheel 3b. The spin turning state is achieved by forwardly driving one of the left rear wheel 3a and the right rear wheel 3b, and reversely driving the other one of the left rear wheel 3a and the right rear wheel 3b.

The mower unit 4 includes a mower deck 4A, which is constituted by a top plate and a side plate. Three blades 47 are provided, which are arranged in the transverse direction for the vehicle body in an internal space of the mower deck 4A, as indicated by dotted lines in FIG. 3. The blades 47 are fixed to drive shafts 48, which are supported with bearings by the top plate of the mower deck 4A. The work transmission mechanism 40 is provided in order to transmit power from the output pulley 22 of the engine 20 to the drive shafts 48. The work transmission mechanism 40 includes input pulleys 41, 42, and 43, which are fixed to the drive shafts 48 of the respective blades 47, direction change pulleys 44, a tension clutch pulley 45, which serves as a work clutch, and a work belt 46, which is hung around these pulleys. With this configuration, the blades 47 rotate at the number of rotations that is proportional to the number of revolutions of the engine. The tension clutch pulley 45 is switched to an ON state or an OFF state by a clutch solenoid 45a.

Figure 4:
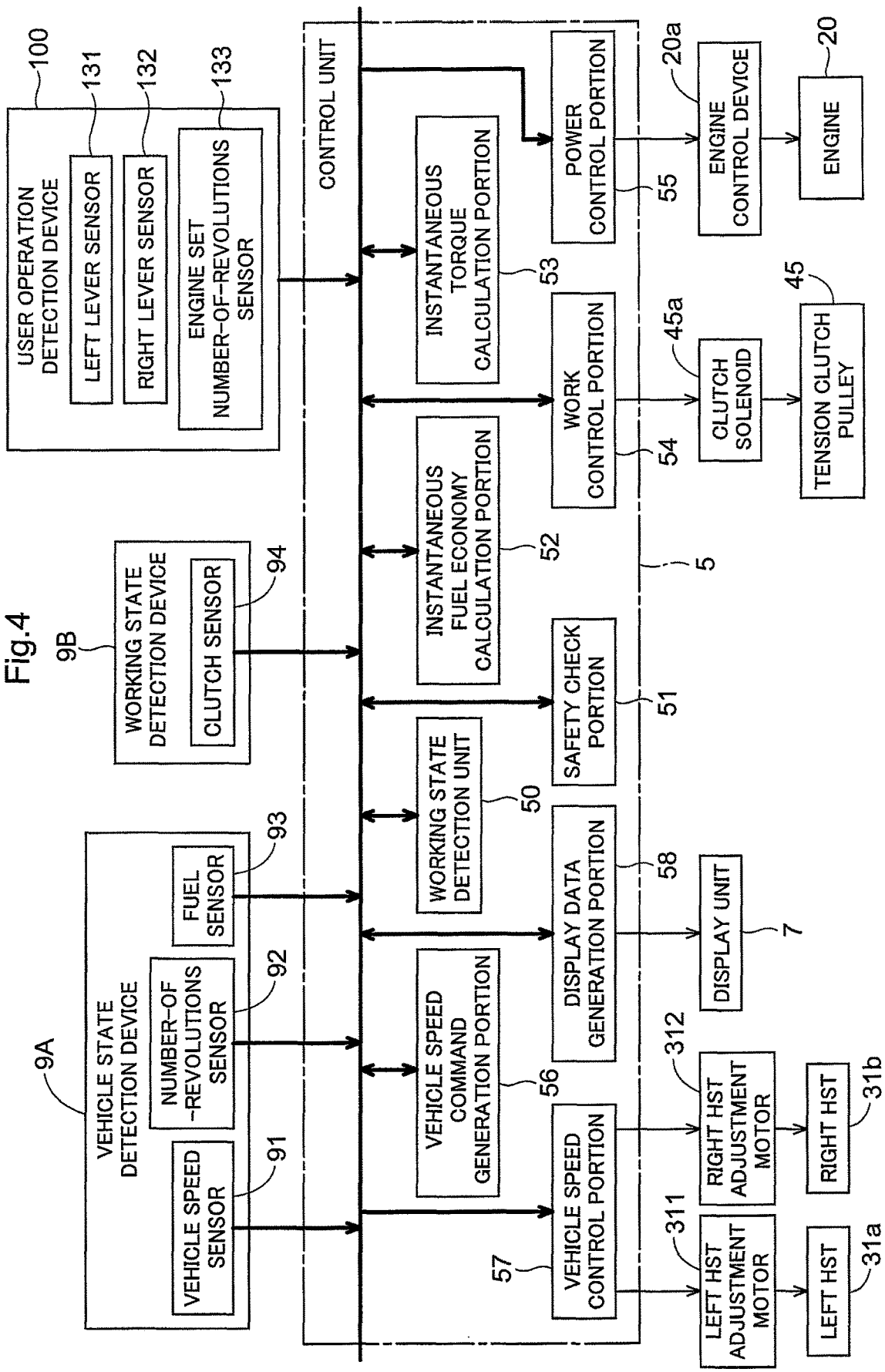
FIG. 4 is functional block diagram of a control system of the mowing machine.

A control system of this mowing machine is shown in FIG. 4. A core member of this control system is a control unit 5, which substantially is a computer system. A vehicle state detection device 9A, a working state detection device 9B, a user operation detection device 100, and the like are connected to the control unit 5. The vehicle state detection device 9A is a generic name of sensors for detecting a state of the vehicle, switches, and the like, and includes a vehicle speed sensor 91 for detecting the vehicle speed, namely the traveling speed of the vehicle body 1, a number-of-revolutions sensor 92 for detecting the number of revolutions of the engine 20, and a fuel sensor 93 for detecting fuel consumption or the amount of remaining fuel. The working state detection device 9B is a generic name of sensors for detecting a working state of the mower unit 4, switches, and the like, and includes a clutch sensor 94 for detecting an ON/OFF state of the tension clutch pulley 45. The user operation detection device 100 is a generic name of sensors for detecting user operations, switches, and the like. The user operation detection device 100 includes a left lever sensor 131 for detecting pivoting displacement of the left steering lever 13*a*, a right lever sensor 132 for detecting pivoting displacement of the right steering lever 13*b*, and an engine set number-of-revolutions sensor 133 for detecting a set value of an engine number-of-revolutions setting tool (not shown), such as an accelerator lever.

Furthermore, a display unit 7, an engine control device 20*a*, a clutch solenoid 45*a*, a left HST adjustment motor 311, a right HST adjustment motor 312, and the like are connected to the control unit 5. The engine control device 20*a* adjusts the number of revolutions of the engine 20 based on a control signal from the control unit 5. The clutch solenoid 45*a* performs an operation to turn on and off the tension clutch pulley 45 based on a control signal from the control unit 5. The left HST adjustment motor 311 and the right HST adjustment motor 312 adjust the angle of swash plates of the left HST 31*a* and the right HST 31*b*, respectively, to change the vehicle speed based on a control signal from the control unit 5.

The control unit 5 includes a working state detection portion 50, a safety check portion 51, an instantaneous fuel economy calculation portion 52, an instantaneous torque calculation portion 53, a work control portion 54, a power control unit 55, a vehicle speed command generation portion 56, a vehicle speed control portion 57, and a display data generation portion 58.

The working state detection portion 50 detects a working state of the mower unit 4 in which the blades 47 are rotating, based on a detection signal from the clutch sensor 94, and manages elapsed time in the working state. For example, a work lapse signal is output every predetermined time while in the working state. The safety check portion 51 manages safety of this mowing machine. For example, the safety check portion 51 detects a neutral state of the left steering lever 13*a* and right steering lever 13*b*, and outputs a lever neutral check signal for safety check.

The instantaneous fuel economy calculation portion 52 calculates, as instantaneous fuel economy, fuel consumption per time in the working state, based on a detection signal from the fuel sensor 93 and the work lapse signal from the working state detection portion 50. Also, the instantaneous fuel economy calculation portion 52 can simply calculate, as the instantaneous fuel economy, fuel consumption per predetermined time increment, irrespective of the work lapse signal. The instantaneous fuel economy calculation portion 52 sends the result in a data format capable of being displayed in percentage, to the display data generation portion 58.

The instantaneous torque calculation portion 53 calculates instantaneous torque that can be output by the engine 20, which is the power source. This instantaneous torque is calculated based on a table that represents a relationship between torque and the number of revolutions of the engine, and the number of revolutions of the engine detected by the number-of-revolutions sensor 92. However, other calculation method may also be used. The instantaneous torque calculation portion 53 can calculate instantaneous torque in the working state based on the work lapse signal from the working state detection portion 50, and can also calculate instantaneous torque at a predetermined time, irrespective of the working state. The instantaneous torque calculation portion 53 normalizes the calculated instantaneous torque by the maximum torque calculated based on the table, and sends the result in a data format capable of being displayed in percentage, to the display data generation portion 58.

The work control portion 54 gives the clutch solenoid 45*a* a control signal for switching on and off the tension clutch pulley 45. The power control portion 55 generates a control signal for controlling the number of revolutions of the engine 20 based on a detection signal from the engine set number-of-revolutions sensor 133, and gives the generated control signal to the engine control device 20*a*.

The vehicle speed command generation portion 56 and the vehicle speed control portion 57 are provided when the steering unit 13 is operated under a by-wire mode. In another embodiment wherein the by-wire mode is not employed and the steering unit 13 is connected to the HSTs 31 (the left HST 31*a* and the right HST 31*b*) via a physical linkage, the vehicle speed command generation portion 56, the vehicle speed control portion 57, the left HST adjustment motor 311 and the right HST adjustment motor 312 may be omitted.

Under the by-wire mode, the vehicle speed command generation portion 56 generates a vehicle speed command based on detection signals from the left lever sensor 131 and the right lever sensor 132, and gives the generated vehicle speed command to the vehicle speed control portion 57. The vehicle speed control portion 57 generates control signals for controlling the rear-wheel unit 3 based on vehicle speed commands (left vehicle speed command and right vehicle speed command). Specifically, a control signal generated based on the left vehicle speed command is given to the left HST adjustment motor 311. As a result, the angle of the swash plate of the left HST 31*a* is adjusted, and the left rear wheel 3*a* realizes the vehicle speed that is based on a user operation. Similarly, a control signal generated based on the right vehicle speed command is given to the right HST adjustment motor 312. As a result, the angle of the swash plate of the right HST 31*b* is adjusted, and the right rear wheel 3*b* realizes the vehicle speed that is based on a user operation.

The display data generation portion 58 generates display data for displaying various kinds of information on the screen 70 of the display unit 7. The display data includes instantaneous fuel economy display data, instantaneous torque display data, safety display data, amount-of-remaining-fuel display data, water temperature display data, engine number-of-revolutions display data, and the like.

Figure 5:
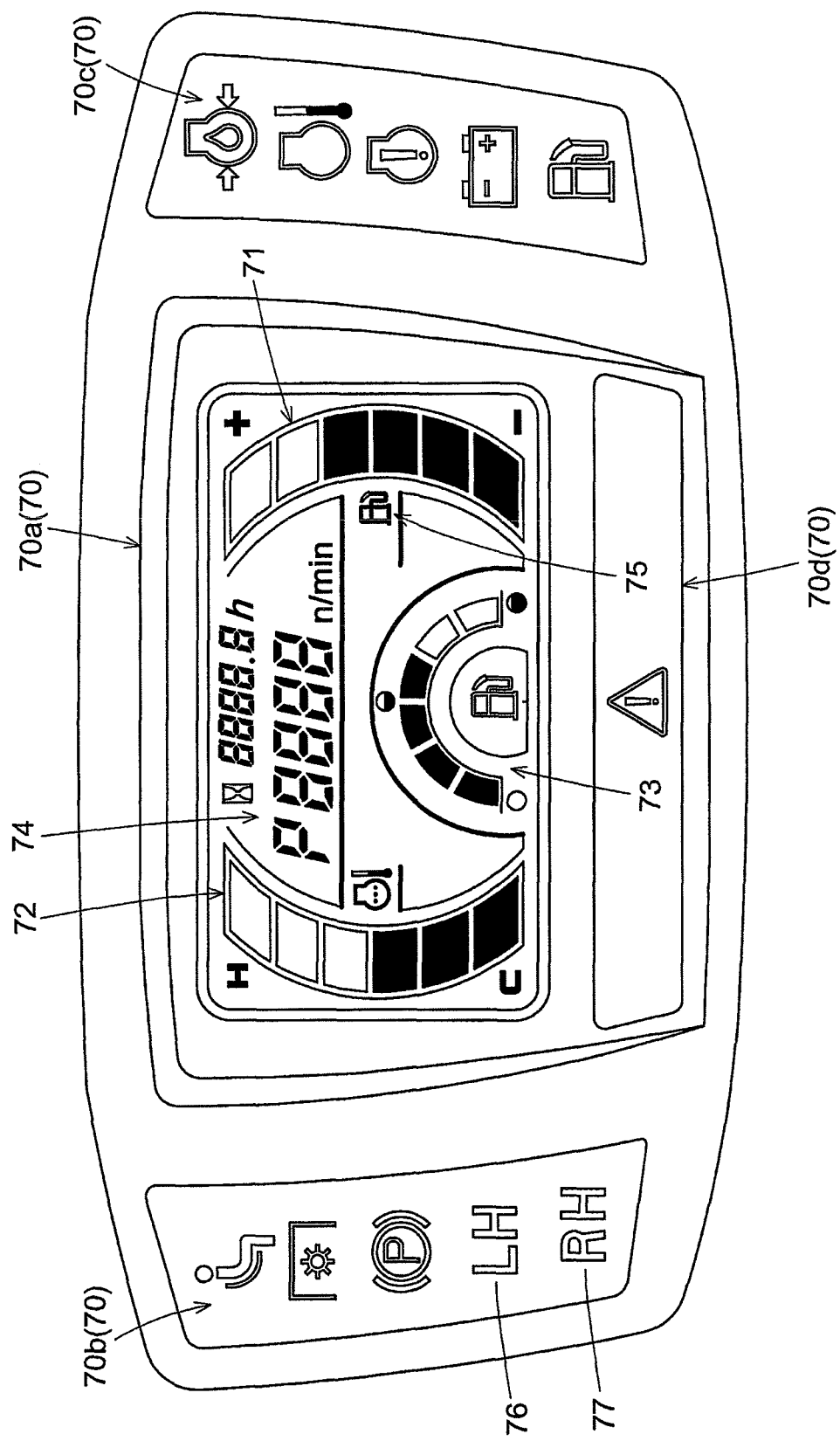
FIG. 5 is a diagram showing an example of a screen of the display unit, which displays instantaneous fuel economy.

As shown in FIG. 5, in this embodiment, the screen 70 is constituted by a first screen 70*a*, which is located at the center of the display unit 7, a second screen 70*b*, which is located on the left side of the first screen 70*a*, a third screen 70*c*, which is located on the right side of the first screen 70*a*, and a fourth screen 70*d*, which is located below the first screen 70*a*.

Figure 6:
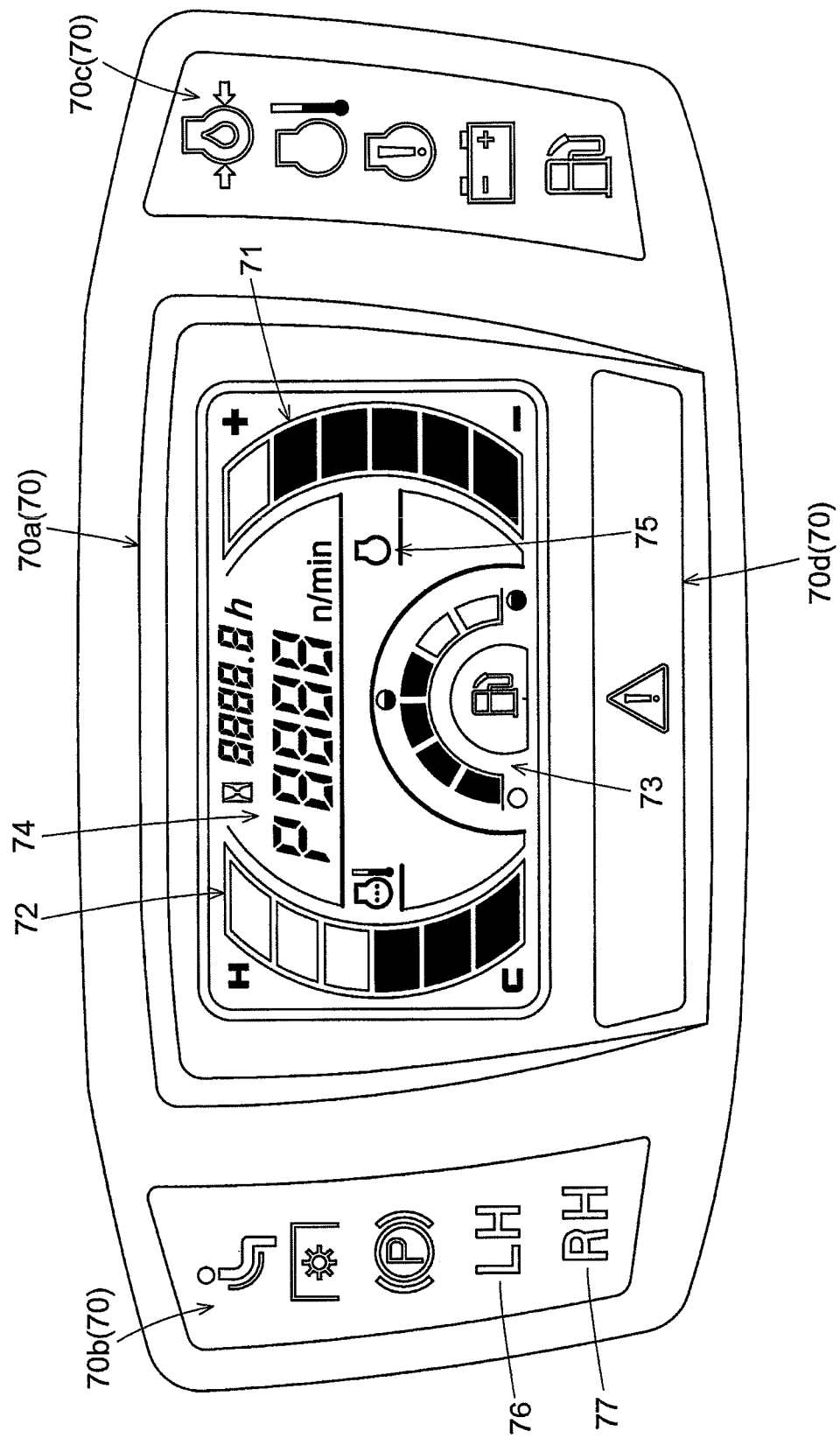
FIG. 6 is a diagram showing a screen that displays instantaneous torque.

The first screen 70*a* is divided into a plurality of changing data display regions 71, 72, 73, and 74 for displaying changing data, namely data whose data value is sequentially changing, in the form of graphs and numbers. An arc-shaped changing data display region 71 on the right side graphically displays instantaneous fuel economy or instantaneous torque in a selective manner. At this time, an identification icon 75 for identifying a selected data type is simultaneously displayed. In FIG. 5, instantaneous fuel economy is displayed in the changing data display region 71. In FIG. 6, instantaneous torque is displayed in the changing data display region 71. Note that an arc-shaped changing data display region 72 on the left side graphically displays water temperature, and a semicircular changing data display region 73 on the lower side displays the amount of remaining fuel. The changing data display region 74, which has a linear shape, displays the number revolutions of the engine in the form of numerical values.

Note that, in another embodiment in which the arc-shaped changing data display region 71 on the right side is provided in the form of two vertical columns, the instantaneous fuel economy and instantaneous torque can be independently displayed. Otherwise, only one of them may be displayed depending on the specifications of the vehicle. In this case, the unnecessary one of the instantaneous fuel economy calculation portion 52 and the instantaneous torque calculation portion 53 is omitted from the control unit 5.

Figure 7:
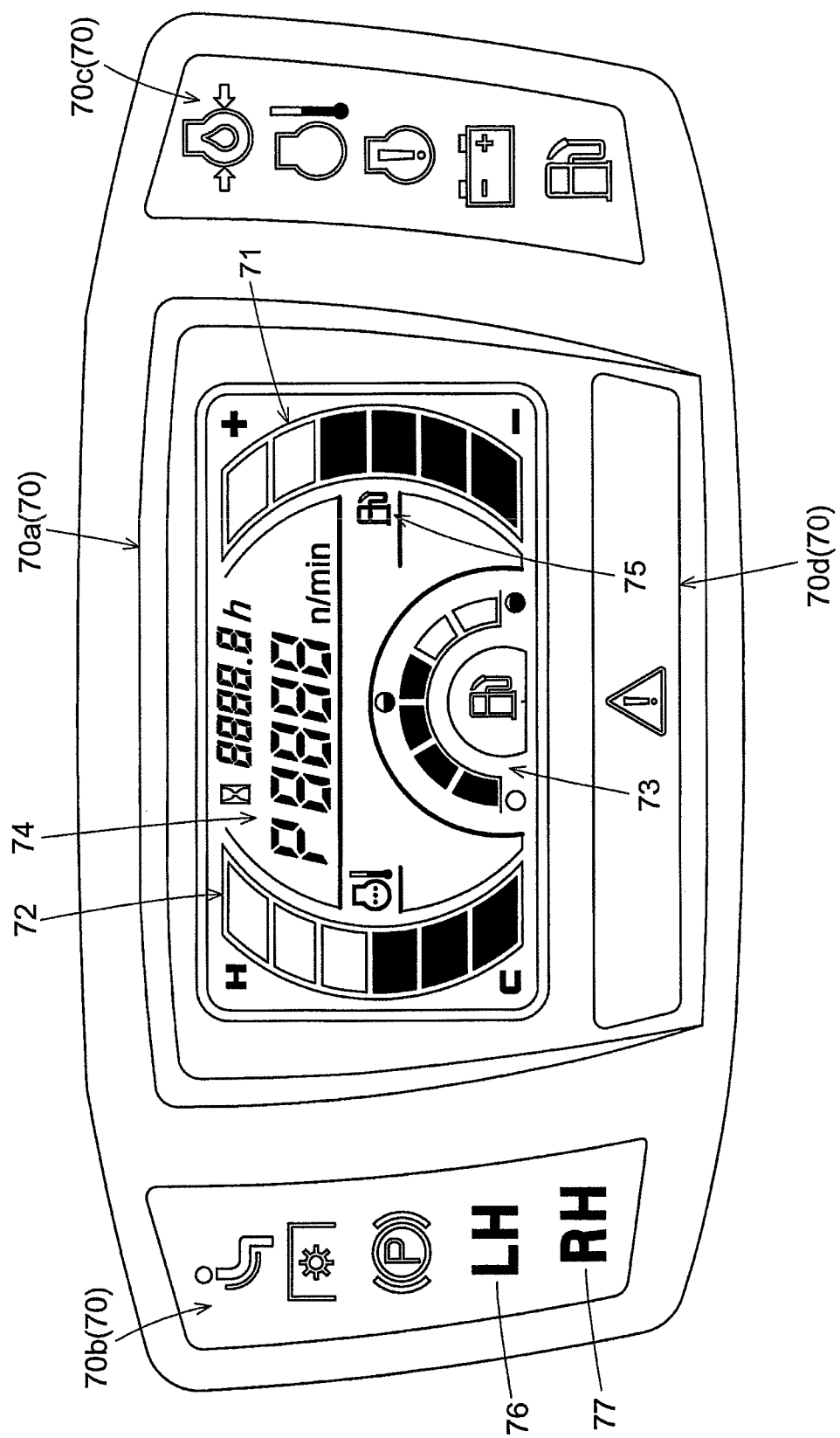
FIG. 7 is a diagram showing a screen that displays neutral icons, each indicating a neutral state of a steering unit.

The second screen 70b displays icons that indicate use status of a seat belt, a parking brake, and the like. The third screen 70c displays alarms regarding overheating, battery exhaustion, and the like. The fourth screen 70d displays other messages or icons to an operator. In this embodiment, safety items checked by the safety check portion 51 are displayed on the second screen 70b. In the screen diagram in FIG. 7, a left neutral icon (which contains characters "LH") 76 that indicates a neutral state of the left steering lever 13a and a right neutral icon (which contains characters "RH") 77 that indicates a neutral state of the right steering lever 13b are displayed as safety indicators. If the left neutral icon 76 and the right neutral icon 77 are displayed, the left steering lever 13a and the right steering lever 13b are in a neutral state. For this reason, even if the engine 20 is started in this state, there is no concern that the vehicle starts to move. If either the left steering lever 13a or the right steering lever 13b is not in a neutral state, safety measures may be taken to perform control for preventing the engine 20 from starting.

In the above embodiment, the fuel is fossil fuel, and the power source is the engine 20, which is an internal combustion engine. A work vehicle such as, for example, an electric mowing machine in which the fuel is electricity stored in a battery and the power source is an electric motor is also included in the present invention as another embodiment. An external appearance of such an electric mowing machine is similar to that of the engine-powered mowing machine shown in FIG. 1.

Figure 8:
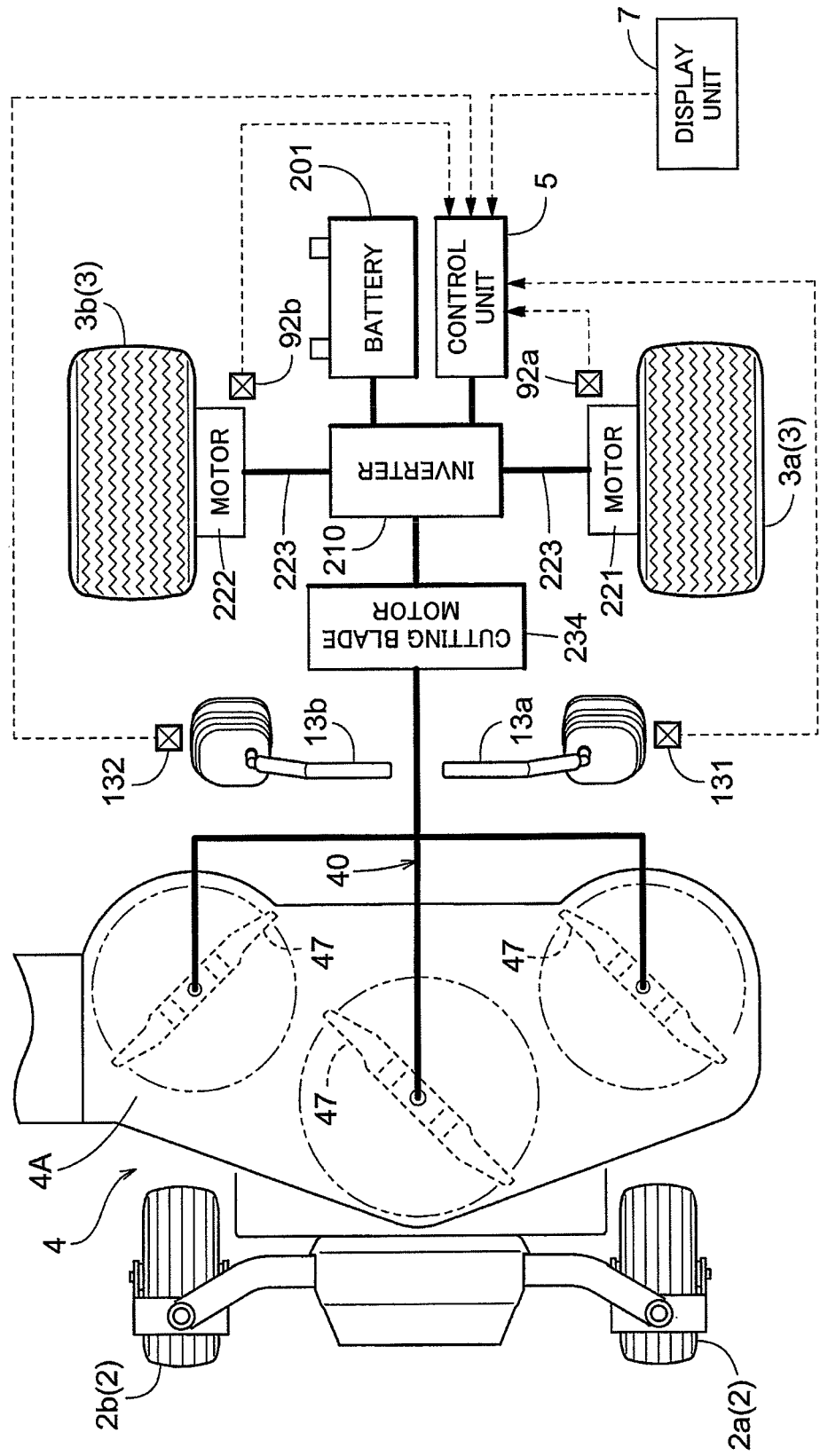
FIG. 8 is a diagram showing a power system of an electric mowing machine.

A diagram showing a power system of that electric mowing machine is shown in FIG. 8. In this electric mowing machine, power sources are a left motor 221 and a right motor 222, which are electric actuators for driving the left rear wheel 3a and the right rear wheel 3b, respectively, to rotate, and electric power is supplied as fuel from a battery 201. The number of rotations of the left motor 221 and the number of rotations of the right motor 222 are detected respectively by motor number-of-rotations sensors 92a and 92b, and are sent to the control unit 5. The battery 201 is arranged at a rear portion of the vehicle body 1. The rotational speeds of the left motor 221 and the right motor 222 are independently changed by electric power supplied via an inverter 210. Accordingly, the number of rotations of the left rear wheel 3a and the right rear wheel 3b can be differentiated, and the direction of the mowing machine is changed by the difference in the number of rotations of the rear-wheel unit 3. Respective traveling transmission mechanisms 223 are provided in order to transmit power between the left motor 221 and the left rear wheel 3a, and between the right motor 222 and the right rear wheel 3b.

In this embodiment as well, as shown in FIG. 8, the mower unit 4 is of a side discharge type with three blades, and is provided with a mower deck 4A and three rotary blades 47. The blades 47 are driven to rotate by power supplied from a cutting blade motor 234, which is an electric actuator, via the work transmission mechanism 40. The cutting blade motor 234 is rotated by power supplied via the inverter 210. The inverter 210 is controlled by the control unit 5. In this embodiment, the power control portion 55 in the control unit is configured to give a control command to the inverter 210. Furthermore, the instantaneous fuel economy calculation portion 52 is configured to calculate, as the instantaneous fuel economy, the amount by which the electricity stored in the battery 201 decreases per (working) time. The instantaneous torque calculation portion 53 is configured to calculate motor torque, which serves as the instantaneous torque, based on a current flowing through the inverter 210 and the number of rotations from the motor number-of-rotations sensors 92a and 92b. Accordingly, the instantaneous fuel economy and/or instantaneous torque can also be displayed on the display unit 7 in this electric mowing machine.

The invention claimed is:

1. A work vehicle comprising: a power source configured to output rotational power by consuming fuel; a traveling apparatus configured to use the rotational power from the power source; a work apparatus configured to use the rotational power from the power source; a display unit having a plurality of data display regions and at least one changing data display region; a working state detection portion configured to detect a working state in which the work apparatus is being driven; an instantaneous fuel economy calculation portion configured to calculate, as instantaneous fuel economy, fuel consumption per time in the working state; an instantaneous torque calculation portion configured to calculate instantaneous torque that can be output by the power source, and a display data generation portion configured to generate at least one of instantaneous fuel economy display data for graphically displaying the instantaneous fuel economy and instantaneous torque display data in the changing data display region, wherein the instantaneous fuel economy and the instantaneous torque are selectively displayed in the changing data display region in a switched manner, together with an icon that is displayed within the changing data display region to identify which of the instantaneous fuel economy and the instantaneous torque is currently displayed within the changing data display region.

2. The work vehicle according to claim 1,
wherein the work apparatus is a mower unit having a blade that rotates using the rotational power, and
the working state detection portion regards a state where the blade is rotating as the working state.

3. The work vehicle according to claim 1,
wherein the fuel is fossil fuel, and the power source is an internal combustion engine.

4. The work vehicle according to claim 1,
wherein the fuel is electricity stored in a battery, and the power source is an electric motor.

5. A work vehicle having two steering control levers, said work vehicle comprising:
a display comprising a status display region displaying status of a plurality of systems including a steering system;

at least one safety switch independently associated with each steering control lever;

an electrical system for controlling or limiting an ability to start the work vehicle based on an open or closed position of a plurality of switches, said plurality of switches including the at least one safety switch associated with each steering control lever;

a display, in the status display region, connected to the electrical system, said display configured to independently indicate a current status of each safety switch.

6. The work vehicle of claim 5, wherein the display comprises a changeable display and an indicator connected to each safety switch.

7. The work vehicle of claim 6, wherein the two steering control levers comprise a left steering lever having a neutral position and a right steering lever having a neutral position and the display comprises a left neutral icon and a right neutral icon.

8. The work vehicle of claim 7, wherein the left neutral icon indicates whether the left steering lever is in its neutral position and the right neutral icon indicates whether the right steering lever is in its neutral position.

9. The work vehicle of claim 5, wherein the work vehicle is a zero-turn mower machine.

* * * * *